(12) United States Patent
Mickael

(10) Patent No.: US 10,024,988 B2
(45) Date of Patent: *Jul. 17, 2018

(54) GAIN STABILIZATION OF RADIATION DETECTORS VIA SPECTRUM ANALYSIS

(71) Applicant: Weatherford Technology Holdings, LLC, Houston, TX (US)

(72) Inventor: Medhat Mickael, Sugar Land, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,173

(22) Filed: Jun. 26, 2017

(65) Prior Publication Data

US 2017/0293040 A1    Oct. 12, 2017

Related U.S. Application Data

(63) Continuation of application No. 14/944,670, filed on Nov. 18, 2015, now Pat. No. 9,702,990.

(51) Int. Cl.
| | | |
|---|---|---|
| *G01T 7/00* | (2006.01) | |
| *G01T 1/20* | (2006.01) | |
| *G01V 5/04* | (2006.01) | |

(52) U.S. Cl.
CPC ............ *G01T 7/005* (2013.01); *G01T 1/2018* (2013.01); *G01V 5/04* (2013.01)

(58) Field of Classification Search
CPC .......... G01T 1/2006; G01T 7/005; G01V 5/04
See application file for complete search history.

(56) References Cited

U.S. PATENT DOCUMENTS

| 4,053,767 A | 10/1977 | Kampfer et al. |
| 4,300,043 A | 11/1981 | Robbins |
| 4,346,590 A | 8/1982 | Brown |

(Continued)

OTHER PUBLICATIONS

"Basic Counting Systems," Canberra U.S.A., Nov. 8, 2010, 13 pages.

(Continued)

*Primary Examiner* — Mark R Gaworecki
(74) *Attorney, Agent, or Firm* — Lewis, Reese & Nesmith, PLLC

(57) ABSTRACT

Prior to actual use in a downhole application, gamma spectrum shape for a gamma detector can be quantified, and a relationship established between detector gain and spectrum shape. Given this relationship, the shape of a gamma spectrum measured after downhole deployment of the detector within a wellbore, for example as part of a tool in a drill string, can be quantified and compared to the pre-established relationship to determine whether the detector gain has drifted due to temperature or operating time effects. Using this relationship, a gain-affecting voltage across the detector (e.g., the photocathode voltage across the photomultiplier tube) can be adjusted to compensate for such drifts and thus to compensate for variations caused by temperature or operating time. With such compensation applied to the detector, resulting gamma spectra reliably indicate actual differences in radiation levels, thus enabling an inference of the composition of the formation at various times/depths.

20 Claims, 12 Drawing Sheets

(56) References Cited

U.S. PATENT DOCUMENTS

| | | |
|---|---|---|
| 5,406,078 A | 4/1995 | Jacobson |
| 5,489,779 A | 2/1996 | Pemper |
| 5,600,135 A | 2/1997 | Jacobson |
| 6,051,830 A | 4/2000 | Moake |
| 6,590,202 B2 | 7/2003 | Mickael |
| 7,005,646 B1 | 2/2006 | Jordanov et al. |
| 7,157,681 B1 | 1/2007 | Tetzlaff |
| 7,253,401 B2 | 8/2007 | Mickael et al. |
| 7,800,052 B2 | 9/2010 | Gadot |
| 8,173,953 B2 | 5/2012 | Stoller et al. |
| 9,329,302 B2 | 5/2016 | Stoller |
| 9,702,990 B2 * | 7/2017 | Mickael ............... G01T 7/005 |
| 2014/0077073 A1 | 3/2014 | Vu et al. |
| 2014/0084149 A1 | 3/2014 | Stoller |
| 2014/0145072 A1 | 5/2014 | Adolph |

OTHER PUBLICATIONS

Diacon, Barry, "Lab #1 Introduction to Gamma Detection and Pulse Height Analysis," Engineering Physics, McMaster University, 3D03 Lab, Nov. 14, 2007, 13 pages.

* cited by examiner

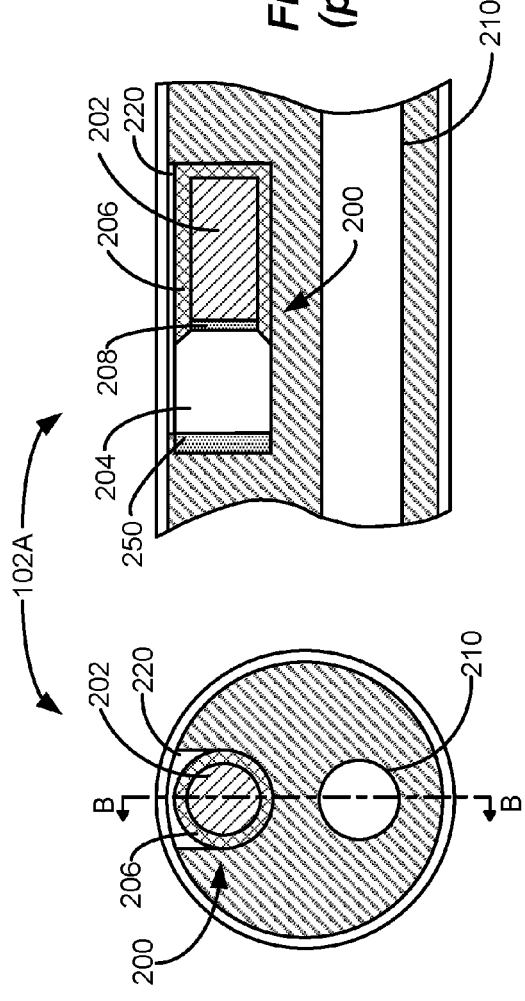
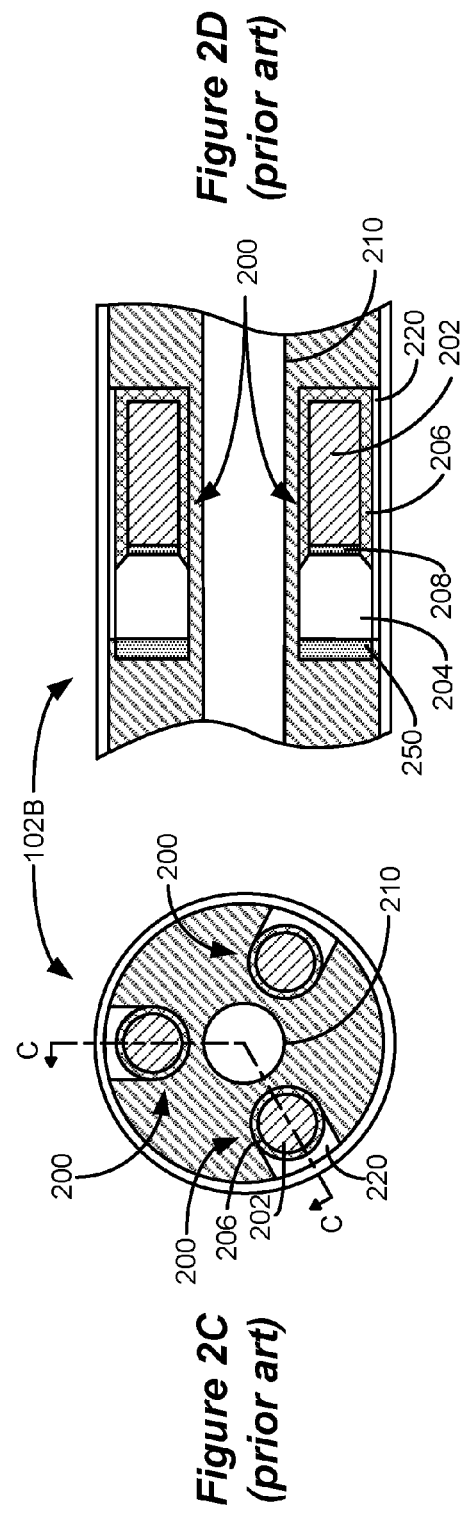
Figure 2A (prior art)
Figure 2B (prior art)
Figure 2C (prior art)
Figure 2D (prior art)

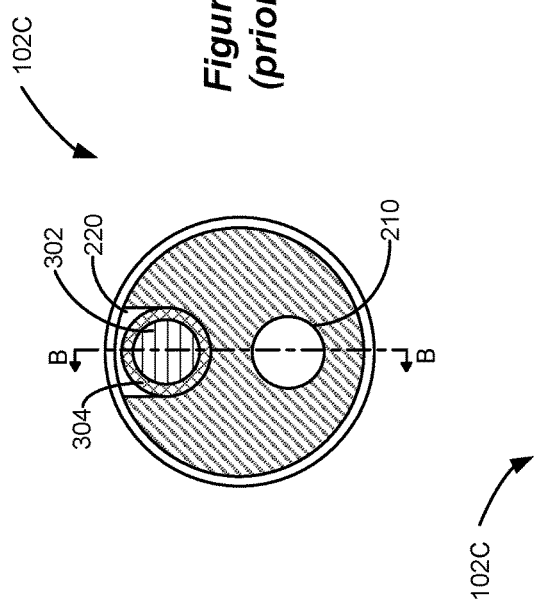
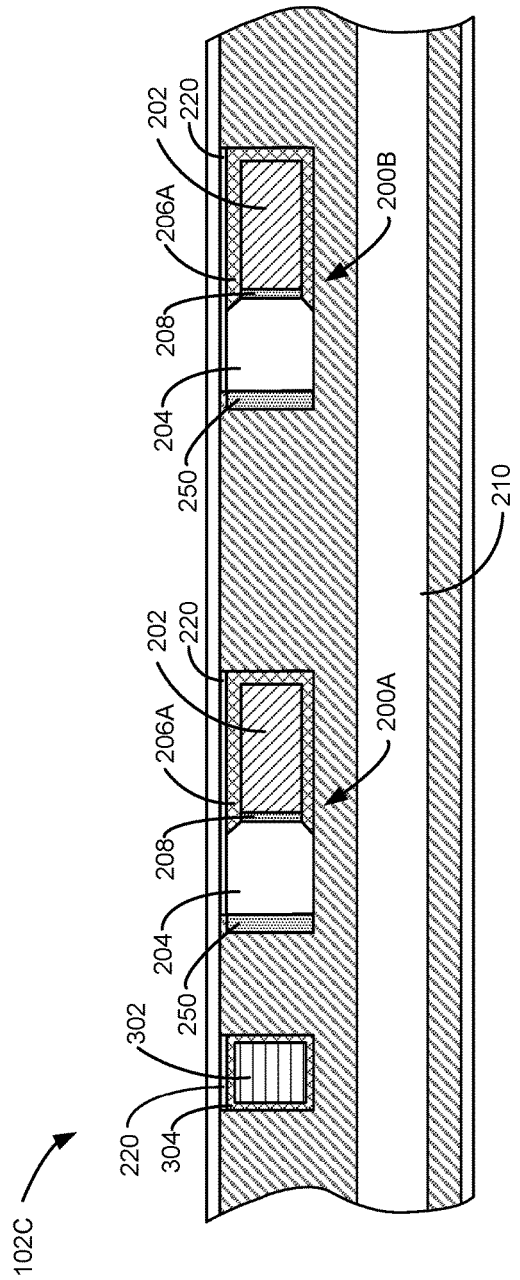

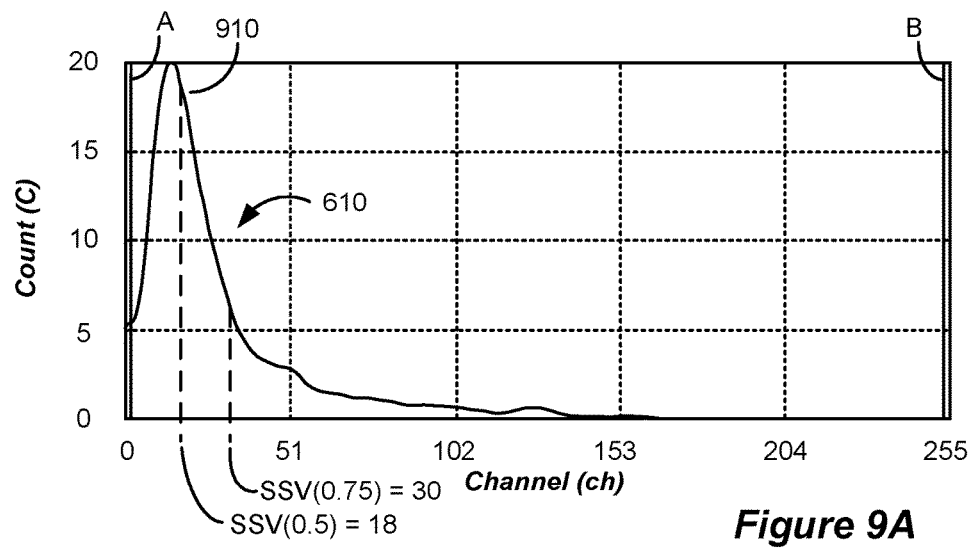
*Figure 9A*
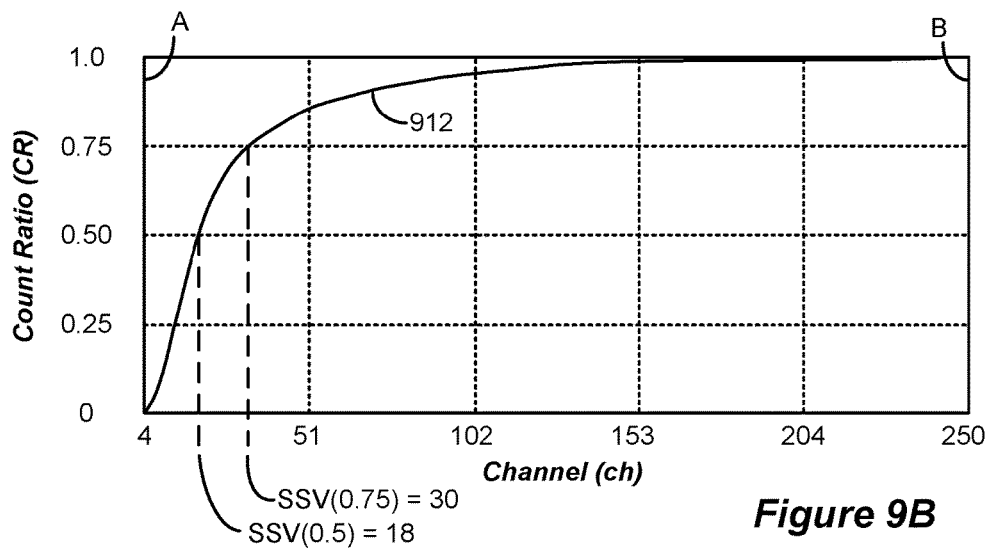
*Figure 9B*

GAIN STABILIZATION OF RADIATION DETECTORS VIA SPECTRUM ANALYSIS

CROSS REFERENCE TO RELATED APPLICATIONS

This is a continuation of U.S. patent application Ser. No. 14/944,670, filed Nov. 18, 2015, to which priority is claimed and which is incorporated herein by reference.

FIELD OF THE INVENTION

The present application relates to techniques for stabilizing the gain of a radiation detector based on analysis of spectra generated by the detector. The application may find particular utility in, and is described in the context of, radiation detectors deployed in wellbores to detect naturally-occurring or induced radiation in subterranean geological formations.

BACKGROUND

For many years, naturally-occurring and induced gamma radiation has been measured to differentiate between different lithologies and/or densities and porosities of subterranean geological formations. In particular, naturally-occurring gamma radiation has been measured within wellbores to derive valuable information regarding the possible location of formations containing desired natural resources e.g., oil and natural gas, etc.) and induced gamma radiation has been measured within wellbores to derive formation density and fluid-filled porosity.

FIG. 1 illustrates the use of a gamma radiation detector 200 used for obtaining these types of measurements during a well drilling operation. As is well known, natural resources such as oil and natural gas are extracted through a conduit (i.e., a wellbore 110) drilled into a formation 101 using a drill bit 108 located at the end of a drill string 106. A rotary drilling rig 120 supports the weight of the drill string 106 and imparts a rotational force to the drill string 106 to cause the drill bit 108 to create the wellbore 110.

The gamma radiation detector 200 is incorporated into a detector tool 102, which forms a housing for one or more detectors 200 and which is attached (e.g., by threads or collars) to the drill string 106, preferably just above the drill bit 108. The detector tool 102 may also be attached directly to the drill bit 108, although another section of drill string 106 may also intervene. As explained further below, the detector tool 102, and hence its detector 200, are exposed to and measure gamma radiation (either induced or naturally-occurring) emitted by the formation 101 traversed by the wellbore 110 as the wellbore 110 is drilled. These measurements, in conjunction with the known depth of the detector tool 102/detector 200 at the time the measurements are recorded, may provide information about the types of formations that are traversed by the wellbore 110. For example, higher levels of gamma radiation at a particular depth may indicate a shale formation 112, which are known to contain higher concentrations of naturally-occurring radioactive materials that emit gamma radiation.

FIGS. 2A and 2B show horizontal (section A-A) and vertical (section B-B) cross sectional views of components within a particular detector tool 102A having a single gamma detector 200. The detector 200 is placed within a pocket 220 formed in the periphery of the detector tool 102A to minimize the distance between the detector 200 and the gamma radiation source, i.e., the formation 101 traversed by the wellbore 110.

The detector 200 includes a scintillation crystal 202 and a light sensor 204, preferably a photomultiplier tube (PMT). As will be described in greater detail below, gamma radiation may interact with the scintillation crystal 202 through various mechanisms to cause the scintillation crystal 202 to emit visible or ultraviolet light that is converted to measurable electrical pulses by the light sensor 204. Electronic circuitry 250 controls the light sensor, and also measures the pulses, as explained further below. Electronic circuitry 250 is shown in FIG. 2B in the form of an electronics module connected to the light sensor 204 portion of the detector 200, although integration of the electronics with the detector 200 and the detector tool 102 can occur in different manners. Spaces within the pocket 220 not occupied by the detector 200 may be filled with a material such as RTV silicone or epoxy. A drilling fluid conduit 210 for conveying drilling fluid from the surface to the drill bit 108 is in the example of FIGS. 2A and 2B displaced from the central longitudinal axis of the detector tool 102A to accommodate the placement of the detector 200 in the detector tool 102A. However, such displacement is not necessary if the detector 200 is small enough.

FIGS. 2C and 2D show horizontal (section A-A) and vertical (section C-C) cross sectional views of components within a different example of a detector tool 102B having three gamma detectors 200, although other plural numbers of detectors could also be used. The detector tool 102B includes the same types of components as the detector tool 102A, and is labeled with the same reference numbers. In the detector tool 102B, the detectors 200 are arranged in pockets 220 that are equally spaced around the periphery, i.e., at 120 degree intervals. The drilling fluid conduit 210 in the detector tool 102B is positioned between the detectors 200 along the central longitudinal axis of the detector tool 102B. The gamma radiation measured by each of the detectors 200 in detector tool 102B can be combined and processed to generate measurements that may be more precise than those produced by detector tool 102A having only a single detector 200. However, the detector tool 102B may have a larger diameter than the detector tool 102A, restricting its use in smaller-diameter wellbores 110.

FIGS. 3A and 3B show horizontal (section A-A) and vertical (section B-B) cross sectional views of components within an induced gamma radiation detector tool 102C that includes a gamma source 302 located within a housing 304. The gamma source 302 emits gamma radiation that passes through material between the tool 102C and the wellbore wall and interacts with the formation adjacent to the tool 102C, which results in induced gamma radiation. A portion of the induced gamma radiation is scattered back into the wellbore 110 where it is detected by one of two detectors 200A/B in the tool 102C. The gamma source 302, such as Cesium-137 or Cobalt-60, is selected such that the primary mode of interaction of the emitted radiation with material it traverses is Compton scattering, which is described below. Compton scattering is related to the electron density of the material in which the interaction occurs, and, electron density is, in turn, related to the bulk density of the material. Therefore, the gamma radiation detected by the detectors 200 can be related to the bulk density of the formation.

Because the source gamma radiation interacts not only with the formation but also with intervening material such as drilling fluid between the tool 102C and the wellbore wall, which can adversely affect the bulk density measurement, two detectors, a "short-spaced" detector 200A and a "long-spaced" detector 200B, are employed such that their responses can be combined in a manner that minimizes the adverse effects in a way that is known in the art. The detectors 200A/B include substantially similar components to the detectors 200 in the tools 102A and 102B and are labeled with the same reference numbers. However, the casing 206A that surrounds the scintillation crystal 202 is selected to attenuate lower energy scattered gamma radiation that is most likely generated via photoelectric absorption (a different form of interaction than Compton scattering as described below). As illustrated, the source housing 304 and the detectors 200A/B are aligned within individual pockets 220 along a periphery of the tool 102C. As in the tool 102A, the drilling fluid conduit 210 is displaced from the central longitudinal axis of the detector tool 102C to accommodate the placement of the source 302 and detectors 200A/B, although other arrangements are also possible. Although the detectors 200A/B are illustrated symbolically with separate electronic circuitry 250, in actuality, the electronic circuitry 250 is common to both detectors 200A/B.

The scintillation crystal 202 in each of the above-described detectors 200 may be formed from materials that exhibit desirable scintillation properties upon interaction with gamma radiation such as sodium iodide doped with thallium (NaI(Tl)), cesium iodide doped with thallium or sodium (CsI(Tl) or CsI(Na)), bismuth germanate (BGO), or other organic or inorganic materials. The scintillation crystal 202 is encapsulated in a hermetically sealed casing 206 that is reflective to visible and ultraviolet light such that external light cannot enter the scintillation crystal 202 and light emitted by the scintillation crystal 202 in response to gamma radiation cannot escape. Light from the scintillation crystal 202 is optically coupled to the light sensor 204 via a transparent cover 208 (e.g., a glass cover) at one end of the scintillation crystal 202, as explained further below.

Gamma radiation refers generally to high-energy electromagnetic radiation having an energy level that exceeds 100,000 electron Volts (100 keV). Naturally-occurring gamma radiation within subterranean geological formations is primarily generated as a result of the radioactive decay of the naturally-occurring radioactive isotopes uranium-238 (Ur), thorium-232 (Th), and potassium-40 (K). Potassium decays directly to a stable element and emits a single gamma radiation photon in the process. Both thorium and uranium decay to stable elements through a chain of radioactive "daughter" elements and emit multiple gamma radiation photons in the process each having a unique energy. Spectra for these various elements are illustrated in FIG. 4, with each vertical line representing a probability of a gamma emission of a particular energy during radioactive decay of the specified element (and its daughter elements). As illustrated in FIG. 4, the energy of naturally-occurring gamma radiation measurable in a subterranean environment typically spans a range of about 0.1 to 3.0 million electron Volts (MeV). The energy of induced gamma radiation is generally between 0.05 and 0.8 MeV.

Gamma radiation detectors such as 200 identify the presence of gamma radiation through the interaction of the gamma radiation with the detector's scintillation crystal 202. Such interaction may occur through three primary mechanisms: photoelectric absorption, Compton scattering, and pair production. Photoelectric absorption involves the complete absorption of a gamma radiation photon by an atom in the scintillation crystal 202, which results in the emission of an electron having an energy that is equal to the energy of the photon minus the electron binding energy. Compton scattering involves a collision between the gamma radiation photon and an electron, which results in a transfer of energy from the photon to the electron. The decreased-energy photon may further interact with the scintillation crystal 202 through either another Compton event or through photoelectric absorption. Pair production involves the creation of a positron-electron pair from the energy of a gamma radiation photon in the vicinity of an atomic nucleus in the scintillation crystal 202. The likelihood of each of the three interactions is dependent upon the energy of the gamma radiation. Photoelectric absorption and Compton scattering are much more likely interactions than pair production at the energy levels of gamma radiation photons emitted by naturally-occurring radioactive materials and Compton scattering is the desired interaction mechanism for induced gamma radiation.

FIG. 5 illustrates further mechanical and electrical details of detector 200 and its electronic circuitry 250, and also describes the process through which gamma radiation photons are converted into measureable pulses. An incoming gamma radiation photon 270 traverses the light-reflective casing 206 (which is only reflective to lower-energy photons) and interacts with the scintillation crystal 202 through one of the interaction mechanisms described above. Regardless of the interaction mechanism, the resultant energetic electrons ultimately cause the emission of a larger number of lower-energy photons 272 (e.g., ultraviolet or visible light) as excited atoms in the crystal 202 return to the ground state. The lower-energy photons 272 have an energy content that is generally proportional to the energy of the gamma radiation photon 270.

Because the crystal 202 is surrounded by the light-reflective casing 206, the resulting photons 272 can only escape the crystal 202 through the transparent cover 208, which is optically coupled to the light sensor 204 (a photomultiplier tube, PMT) using an optical coupling fluid 212. Optical coupling fluid 212, such as a non-aqueous oil or grease, preferably has an index of refraction that very nearly matches that of the crystal 202 and the cover 208 to promote the efficient transfer of the photons 272 to the PMT 204.

The PMT 204 is an evacuated tube containing a photocathode 230, several dynodes 232, and an anode 234 within a glass housing. The photocathode 230 is held at a high negative voltage $V_{PC}$ that is supplied from a power supply 260, and the anode 234 is held at voltage $V_A$ which may be near a ground potential. The dynodes 232 form a voltage gradient between $V_{PC}$ and $V_A$ with each of the dynodes 232 being held at a higher potential than the node preceding it (i.e., $V_{PC}<V_F<V_E \ldots <V_B<V_A$). The voltage differential between $V_{PC}$ and $V_A$ may be on the order of 900 to 1100 Volts. The distributed voltages are created by a voltage divider circuit 233 including a number of resistors, which may be of equal value. It should be noted that the actual PMT 204 might include more dynodes 232 than shown in FIG. 5. Although not illustrated, electronic circuitry 250 may include one or more capacitors across the dynodes 232 to help stabilize their voltages as electrons propagate through the PMT 204, and as now explained.

As the photons 272 exit the crystal 202 through the cover 208, they strike the photocathode 230, which is a conductive, photosensitive coating that is applied to the surface of the PMT adjacent to the cover 208. Upon the arrival of the photons 272, a small group of primary electrons 274 is ejected from the surface of the photocathode 230 as a consequence of the photoelectric effect. The primary electrons 274 leave the photocathode 230 with an energy equal to the incoming photons 272 less the work function of the photocathode 230. Due to the geometric arrangement of the dynodes 232 and the manner in which they are biased, the primary electrons 274 are accelerated toward the first dynode 232F, increasing their kinetic energy. Upon striking the dynode 232F, the increased-energy primary electrons 274 cause the emission of a greater number of lower-energy secondary electrons, which are in turn accelerated toward the next dynode 232E. This process continues and results in an exponential increase in the number of electrons that arrive at the anode 234. For example, if at each dynode 232 an average of five new electrons are produced for each incoming electron, and if there are ten dynode stages, then each primary electron 274 will result in $5^{10} \approx 10^7$ electrons arriving at the anode 234.

The large number of electrons arriving at the anode 234 produces an electrical pulse, which is measured by the electronic circuitry 250. Voltage-divider resistors 236 are sized to decrease the voltage at the anode 234 containing the pulse. A DC-blocking capacitor 240 removes the DC component of this decreased voltage signal, such that only the AC portion of the voltage signal caused by the pulse (and ultimately by the gamma radiation photon 270) is passed for further processing. This AC voltage signal is preferably pre-processed by a preamplifier 242 and further amplified by an amplifier 244. The amplifier 244 may further shape the electrical signal, for example, by generating a biphasic pulse with a shortened decay time.

FIG. 6A illustrates a stream of pulses 604 generated by the amplifier 244 in response to the detection of various gamma radiation photons 270 by the detector 200. As a result of the detection physics involved, the magnitude 606 of each pulse 604 is proportional to the energy of its associated gamma radiation photon 270. The pukes 604 are digitized by an Analog-to-Digital converter (ADC) 252 (FIG. 5), and the digitized pulses, or at least their magnitudes 606, are stored in a memory 254.

The digitized magnitudes 606 for each pulse are provided from memory 254 to a controller 256 (e.g., a microprocessor, a microcontroller, a FPGA, or other logic circuitry), which creates a gamma spectrum such as spectrum 610 or spectrum 620 as shown in FIG. 6B. Spectrum 610 is an example of a naturally-occurring gamma radiation spectrum and spectrum 620 is an example of an induced gamma radiation spectrum. Essentially, each of the gamma spectra 610 and 620 comprises a histogram, in which each pulse increments a count of a particular bin or "channel" based on its magnitude 606. In this regard, each of the channels is generally indicative of the energy of the incoming gamma radiation photon 270.

For example, in FIGS. 6A and 6B, the expected energy range of the incoming gamma radiation photons 270 (0 to 3.0 MeV) is split into 256 channels each spanning an energy range of approximately 11.7 keV. A count for a channel is incremented when a pulse 604 has a magnitude 606 that corresponds to that channel's magnitude range. In FIG. 6A, pulses 604A and 604D have magnitudes 606A and 606D that are both within a range associated with channel 22 (or an energy of about 257.4-269.1 keV); pulse 604B has a magnitude 606B within a range associated with channel 26 (or an energy of about 304.2-315.9 keV); pulse 604C has a magnitude 606C within a range associated with channel 17 (or an energy of about 198.9-210.6 keV); and pulse 604E has a magnitude 606E within a range associated with channel 67 (or an energy of about 783.9-795.6 keV). Given these example pulses, an associated gamma spectrum would have a count value of two for channel 22; and count values of one for each of channels 17, 26, and 67. Over time and given the occurrence of more pulses, the controller 256 will populate the entire gamma spectrum as shown in FIG. 6B. Note that count values for each channel may also be established by the controller 256 on a per-time basis, such that each channel is graphed versus a count rate (e.g., counts per second). "Count" as used herein should be understood as indicating either an absolute number of counts or a count rate. While the remainder of the specification refers generally to detectors measuring naturally-occurring gamma radiation and thus producing spectra such as spectrum 610, the invention described herein is equally applicable to detectors measuring induced gamma radiation and thus producing spectra such as spectrum 620.

Ideally, the shape of the gamma spectrum 610 depicted in FIG. 6B should generally represent the summed effect of all radioactive isotopes present in the formation 101. Thus, if only uranium is present in the formation, the gamma spectrum 610 should ideally bear resemblance to the uranium spectrum of FIG. 4. However, gamma spectra 610 as produced by detector 200 instead generally appear as shown in FIG. 6B as a smooth curve that peaks at lower energies. Such shape results from various non-idealities in detection, as well as the fact that detection is generally of more than one nuclear isotope. For example, the size of detector's scintillation crystal 202 affects the shape of gamma spectra 610 produced, because the crystal's ability to interact with higher-energy gamma radiation decreases as its size decreases. Thus, gamma spectra 610 typically exhibit a peak at the lower energies the scintillation crystal 202 is more easily able to detect, and the energy of such peaks will decrease as the size of the crystal decreases. Even given such non-idealities in the shape of gamma spectra such as 610, it is worth mentioning that such spectra may also provide details about the relative mixtures of radioactive isotopes to enable techniques such as clay typing and geochemical logging.

Once gamma spectra 610 are determined by the controller 256 and stored as a function of time/depth, they may be stored in memory 254 and later consulted via a computer system 114 (FIG. 1) once the drill string 106 and detector tool 102/detector 200 are retrieved from the wellbore 110 to better understand the composition of the formation. Alternatively, memory 254 may simply include the raw pulse magnitude 606 information stored as a function of depth/time, leaving it to the computer system 114 to generate gamma spectra 610 as a function of time/depth, Alternatively, and although not shown, electronic circuitry 250 can include means for communicating either raw pulse magnitude 606 information or gamma spectra 610 to the computer system 114, such as by mud pulse telemetry or other wired or non-wired means.

While gamma spectra 610 data can provide valuable information regarding the possible composition of the formation 101 traversed by the wellbore 110 as a function of depth, such data is most valuable when normalized to account for parameters that cause pulse magnitude 606 to vary, in particular temperature and time of operation of the PMT 204. FIG. 7 illustrates the effect of these two parameters on pulse magnitude 606. As illustrated, increased temperatures for prolonged operating times will cause decreases in pulse magnitude 606 for the same gamma event (e.g., a Potassium-40 emission). Such a change in pulse magnitude 606 can be referred to as a change in "gain" of the detector 200, which gain value is typically referenced to a value of 1.0, with decreases in gain comprising a value between 0 and 1.0, and increases in gain comprising a value of greater than 1.0. Unless the detector 200 is adjusted to accommodate for changes in gain these parameters cause, the pulse magnitudes 606, and hence the resulting gamma spectra 610 determined at various wellbore 110 depths, will not be comparable and thus will not accurately illuminate different possible resources at different portions of the formation.

Various prior art approaches focus on adjusting the gain of the detector 200 (i.e., the pulse magnitudes 606) by adjusting the voltage applied to the photocathode 230 ($V_{PC}$) by the adjustable power supply 260. In this regard, note that the power supply 260 provides an adjustable regulated voltage output responsive to a voltage set point supplied by the controller 256, which may be delivered to the power supply 260 as an analog signal or via one or more digital signals. Such approaches varying $V_{PC}$ seek to normalize changes in gain caused by either or both of the temperature and operating time parameters, and generally fall into three categories.

A first category involves providing the detector 200 with an additional known low-level radiation source (sometimes known as an Energy Compensation Source, or ECS). Such a reference radiation source provides known gamma excitation to the detector 200, and thus $V_{PC}$ can be adjusted by the controller 256 to produce pulse magnitudes 606/gamma spectra 610 that are expected for this source. However, such prior art techniques are not preferred as they require accommodation of the additional reference radiation source with the tool 102, adding additional cost, safety, and regulatory considerations. Moreover, typical reference sources emit radiation at low energy levels at which it may be difficult to distinguish the signal corresponding to the reference source from signal noise caused by tool vibration that is prevalent in the low energy region.

A second category involves adding a temperature sensor with or near the detector 200, and adjustment of $V_{PC}$ based upon the measured temperature in conjunction with a temperature-$V_{PC}$ relationship table stored in the electronic circuitry 250. But this approach is not preferred because it also requires additional cost and complexity. Further, mere adjustment of $V_{PC}$ on the basis of temperature does not address the reality that operating time at temperature also causes variation, which requires changes to the temperature table to reflect the degradation in the performance of the PMT, as FIG. 7 shows. Further, such temperature sensing techniques are also subject to hysteresis, further compromising their accuracy over time.

A third category—into which the present invention also falls—involves algorithmic analysis by the controller 256 of measured gamma spectra 610, and resulting adjustment of $V_{PC}$. For example, known gain stabilization techniques adjust photocathode voltage as a function of properties related to the location of a spectral peak. However, the spectral peak is often difficult to locate, especially in "clean" zones having lower radioactive material content and therefore lower count rates.

The invention disclosed in this application provides a new and improved algorithmic gamma spectral analysis technique for adjusting detector gain to compensate for variations in both temperature and operating life of the detector 200.

BRIEF DESCRIPTION OF THE DRAWINGS

FIGS. 2A-2B show horizontal (FIG. 2A) and vertical (FIG. 2B) cross-sectional views of a detector tool having a single gamma radiation detector, in accordance with the prior art.

FIGS. 2C-2D show horizontal (FIG. 2C) and vertical (FIG. 2D) cross-sectional views of a detector tool having three gamma radiation detectors, in accordance with the prior art.

FIGS. 3A-3B show horizontal (FIG. 3A) and vertical (FIG. 3B) cross-sectional views of an induced gamma radiation detector tool having two gamma radiation detectors, in accordance with the prior art.

FIGS. 9A and 9B show gamma spectrum shape quantification processes, and computation of spectrum shape values (SSVs), in accordance with an example of the invention.

DETAILED DESCRIPTION OF THE INVENTION

Figure 7:
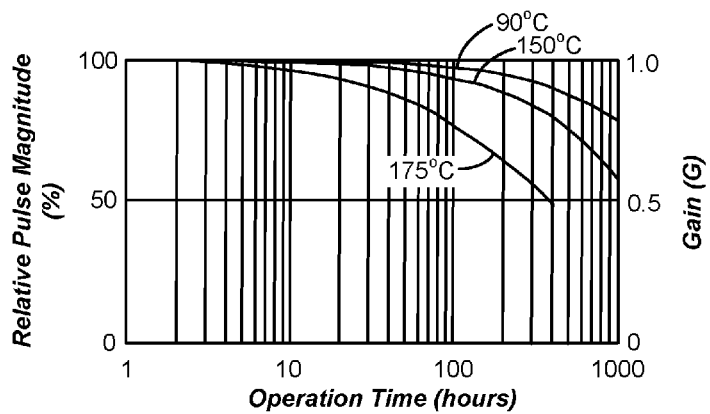
FIG. 7 shows the impact of temperature and operation time on gamma radiation detectors, in accordance with the prior art.

The inventor notes that a given detector 200 or group of detectors (of a given size) should exhibit a relatively consistent shape in the gamma spectra 610 it/they produces assuming no changes to the formation being monitored. Thus, if gamma spectra 610 are changing shape, and especially if such shape changes result in a left or right shift in the spectrum, such changes can be assumed to be attributable to changes in detector gain resulting from changes in parameters such as temperature and operating time (FIG. 7). These shape changes can therefore be utilized to determine the drift in gain of a detector, and to compensate therefore so that spectra can be compared to provide a truer indication of radioactive isotopes present in formations unaffected by such parameters.

The inventor has conceived of a mechanism by which, prior to actual use in a downhole application, gamma spectrum shape for a detector can be quantified, and a relationship established between detector gain and spectrum shape. Given this relationship, the shape of a gamma spectrum measured after downhole deployment of the detector within a wellbore, for example as part of a tool in a drill string, can be quantified and compared to the pre-established relationship to determine whether the detector gain has drifted due to temperature or operating time effects. Using this relationship, a gain-affecting voltage across the detector (e.g., the photocathode voltage $V_{PC}$ across the photomultiplier tube) can be adjusted to compensate for such drifts and thus to compensate for variations caused by temperature or operating time. With such compensation applied to the detector, resulting gamma spectra reliably indicate actual differences in radiation levels, thus allowing a reader to infer the composition of the formation at various times/depths, and hence the likelihood of the presence of desired natural resources at those depths.

Figure 5:
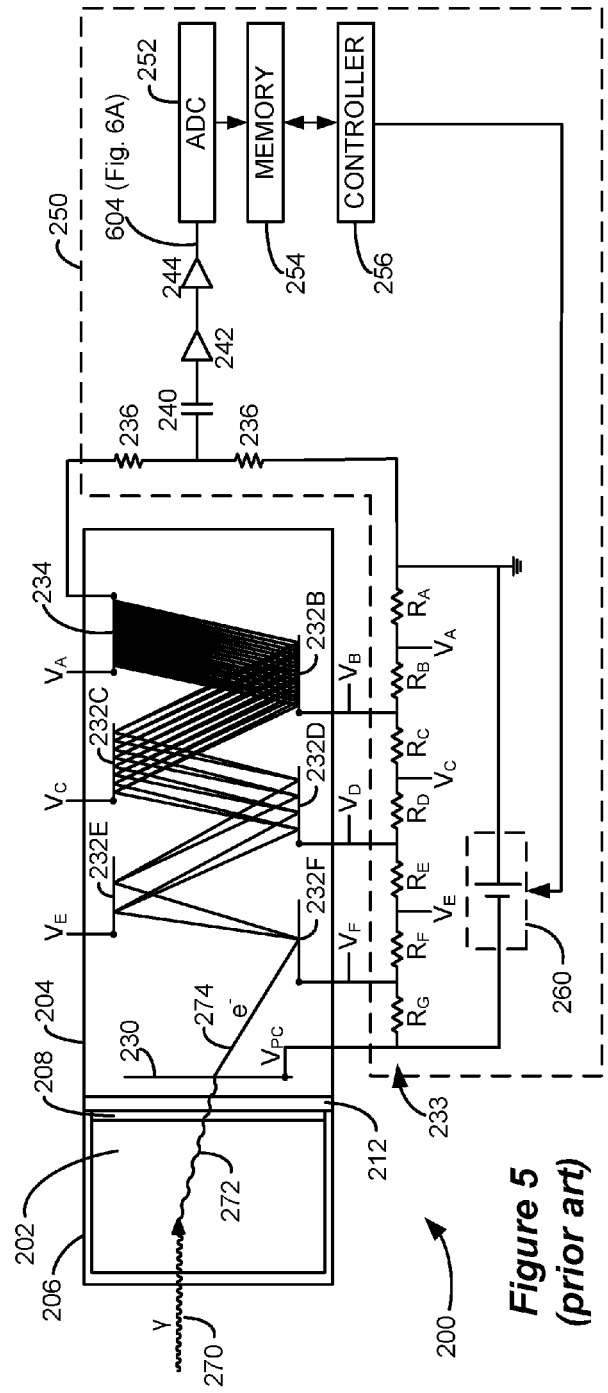
FIG. 5 shows various mechanical and electrical aspects of a gamma radiation detector, in accordance with the prior art.
Figure 8:
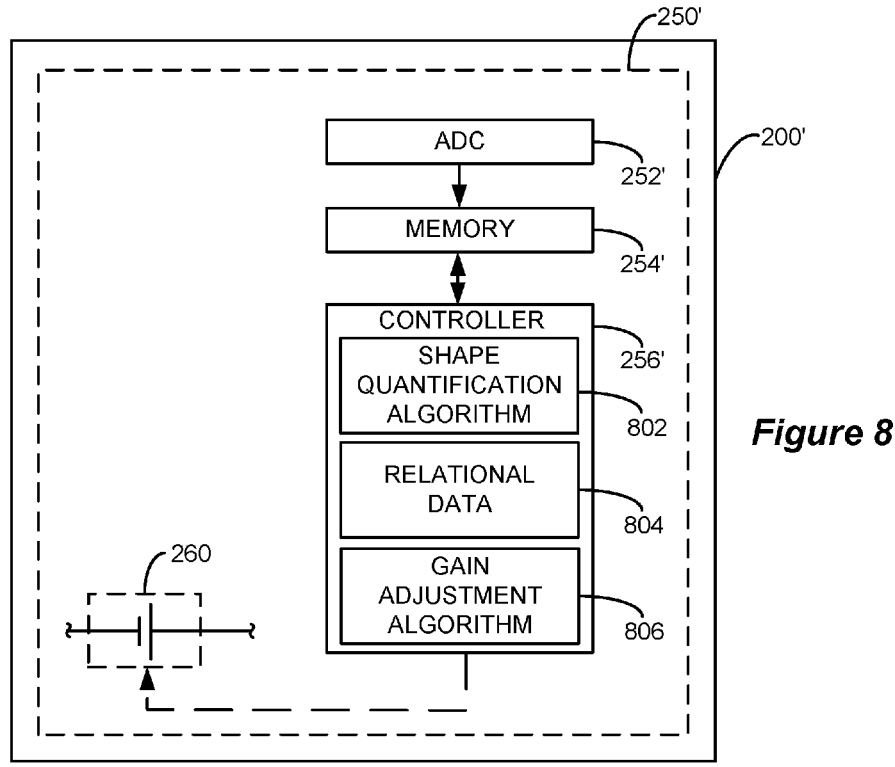
FIG. 8 shows the components of an improved detector, in particular improved electronics in a detector, in accordance with an example of the invention.

As illustrated in FIG. 8, an improved detector 200' includes a controller 256' that incorporates a shape quantification algorithm 802, relational data 804, and a gain adjustment algorithm 806. Such algorithms/data may be implemented as firmware in the controller 256', or stored in whole or in part in associated memory 254'. Additional mechanical components of the detector 200' are the same as described above with respect to FIG. 5 and are omitted for purposes of clarity.

Figure 1:
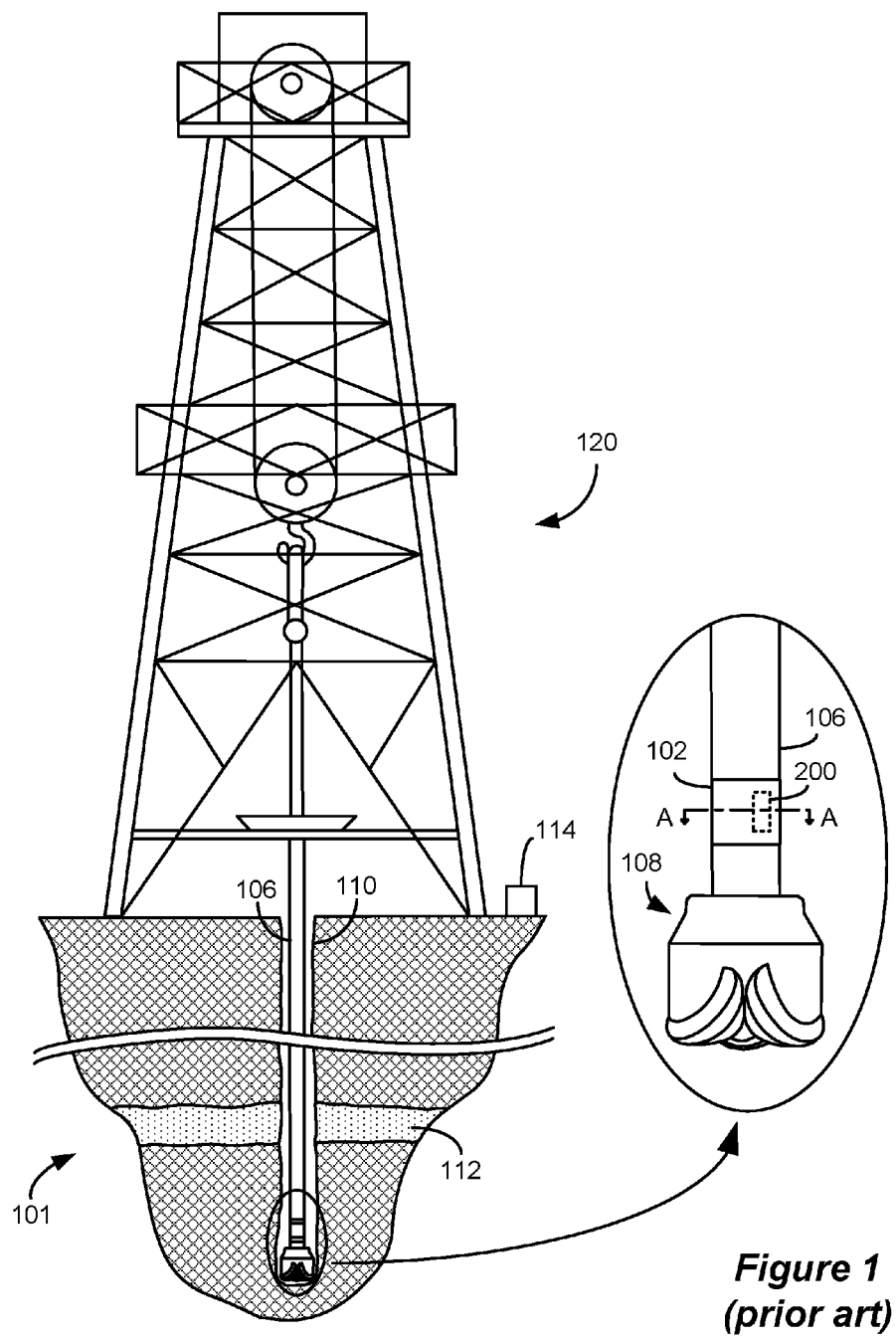
FIG. 1 shows an overview of the use of a gamma radiation detector in a detector tool during a well drilling operation, in accordance with the prior art.
Figure 4:
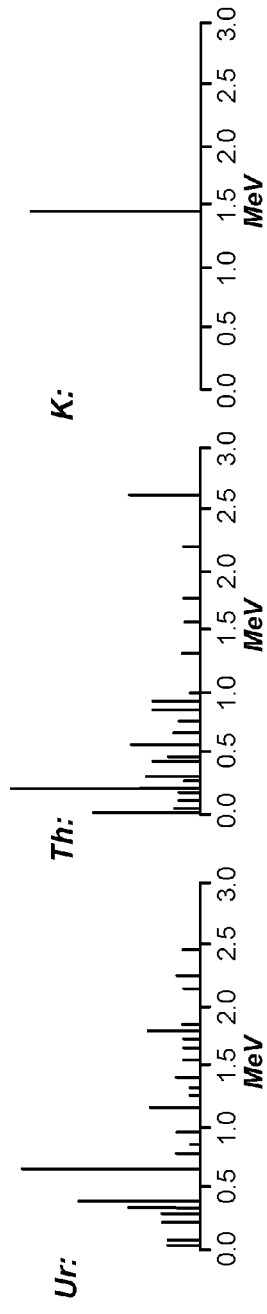
FIG. 4 shows the likelihood of gamma emissions at different energy levels for the radioactive decay of various naturally-occurring radioactive materials, in accordance with the prior art.

Important to the present disclosure is both the development (pre-deployment downhole) and use (after deployment downhole) of relational data 804 for a particular detector 200' or group of similarly built detectors 200'. While development and use of the relational data 804 have related aspects, development is discussed first with reference to FIGS. 9A-11B. Development of the relational data 804 may occur using different hardware than the detector 200' itself (e.g., its controller 256'), and may for example involve use of a top-side computer system 114 (FIG. 1) coupled to the detector 200'. Once relational data 804 is established at the computer system 114, it can then be stored in the detector 200' (e.g., in its memory 254'), and used by the gain adjustment algorithm 806 after deployment to adjust $V_{PC}$ to compensate for variations caused by temperature and operating time. That being said, relational data 804 may also be established exclusively using the detector's hardware.

Figure 6A:
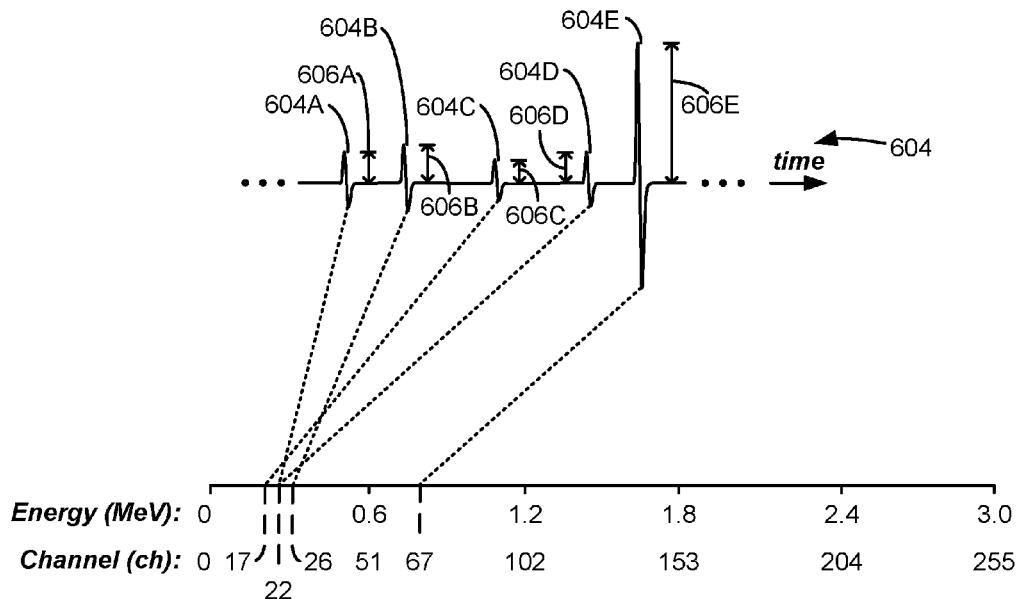
FIGS. 6A and 6B show the manner in which gamma radiation photons are identified and compiled into a gamma spectrum, in accordance with the prior art.
Figure 6B:
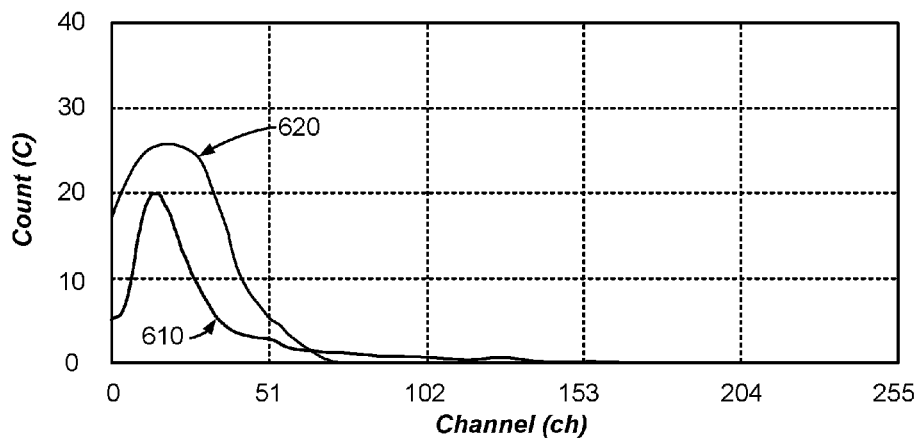

Development of relational data 804 starts first by use of the shape quantification algorithm 802, as illustrated in FIGS. 9A and 9B using the gamma spectrum 610 of FIG. 6B as an example. The first step in the shape quantification algorithm 802 is to select a range of channels over which the gamma spectrum 610 will be assessed. The spectrum 610 can be assessed over the full range of channels (e.g., channels 0-255 in the example shown), but there may be reasons for selecting and accessing a smaller range of channels. For example, it may be desirable to eliminate the effect of any potentially "noisy" data at upper and lower extremes of the spectrum by disregarding a number of channels at each extreme. The selected range of channels assessed by the shape quantification algorithm 802 may in one example be channels 4 through 250, as represented by the lower boundary A and upper boundary B.

The shape quantification algorithm 802 may also select a narrower portion of the gamma spectrum 610 determined to be sufficiently representative of spectrum shape, and set lower and upper boundaries A and B accordingly. For example, because the majority of the detected gamma radiation occurs within the lower-energy portion of the spectrum 610, the selected range may be limited to channels within that portion of the spectrum (e.g., A=0 and B=100). The selected range might also be determined dynamically based on properties of the measured spectrum. For example, the selected range may be determined in accordance with one or more count (rate) thresholds, with the range defined by the lowest channel (A) exceeding a lower threshold and/or a highest channel (B) exceeding an upper threshold. Similarly, the range might be selected to disregard a particular percentage of the total count at either or both of the extremes of the spectrum (e.g., with 0 to A disregarding the lowest 5% of count, and B to 255 disregarding the highest 5% of count).

Once the assessment range of channels is determined, the shape quantification algorithm 802 next determines a spectrum shape value (SSV)—i.e., a number indicative of the shape of the gamma spectrum 610. In one example, the SSV can be computed by first determining a count ratio (CR), as shown in FIG. 9B. The count ratio for each channel (ch) comprises the number of counts (C) present in the gamma spectrum 610 up to that channel (from A to ch), normalized by the total number of counts in the spectrum (from A to B). Stated differently, the count ratio for each channel comprises the integral (area under the gamma spectrum 610) of the count up to the channel, divided by the integral of the entire spectrum (excluding portions of the spectrum beyond the lower boundary A and upper boundary B). Mathematically, this count ratio (CR) can be expressed as:

$$CR(ch) = \frac{\sum_{A}^{ch} C}{\sum_{A}^{B} C}$$

The count ratio is plotted in FIG. 9B for the gamma spectrum 610 of FIG. 9A, and ranges between 0 and 1 as expected.

The spectrum shape value (SSV) can then be determined using the count ratio, and can comprise a channel that renders a particular count ratio for the gamma spectrum under investigation. Two SSVs are shown in FIGS. 9A and 9B. A first SSV (SSV(0.5)) determines the channel (18) at which CR=0.5. Note that this SSV(0.5)=18 would also comprise the statistical median of the gamma spectrum 610—i.e., the channel equally dividing the number of counts in the spectrum. A second SSV (SSV(0.75)) determines the channel (30) at which CR=0.75. In summary, the SSV comprises a particular channel computed using a particular count ratio, which generally provides information about the shape of the gamma spectrum 610, for example, whether the spectrum is peaked at a high or low energy/channel number.

Note that the SSV may for simplicity be determined as the whole number channel that is closest to the predetermined count ratio. Alternatively, the SSV may be interpolated, and thus comprise a non-whole-value channel number. While it is illustrative in FIG. 9B to plot the entire count ratio across all channels, note that in an actual determination of SSV that this is unnecessary and instead that SSV can be determined using mathematical shortcuts.

Figure 10A:
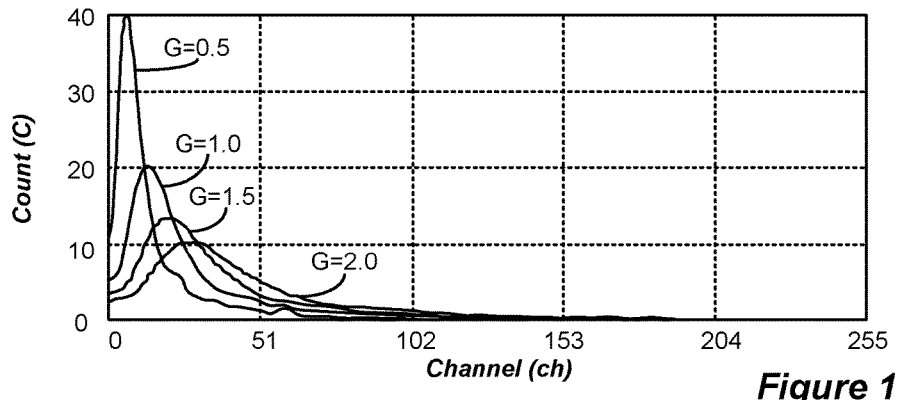
FIGS. 10A-10C show the generation of relational data between spectrum shape and gain, in accordance with an example of the invention.
Figure 10B:
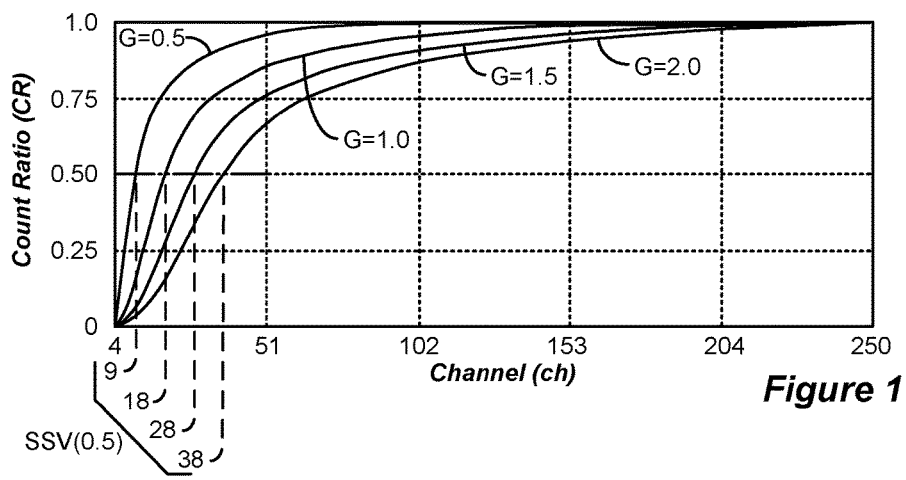
Figure 10C:
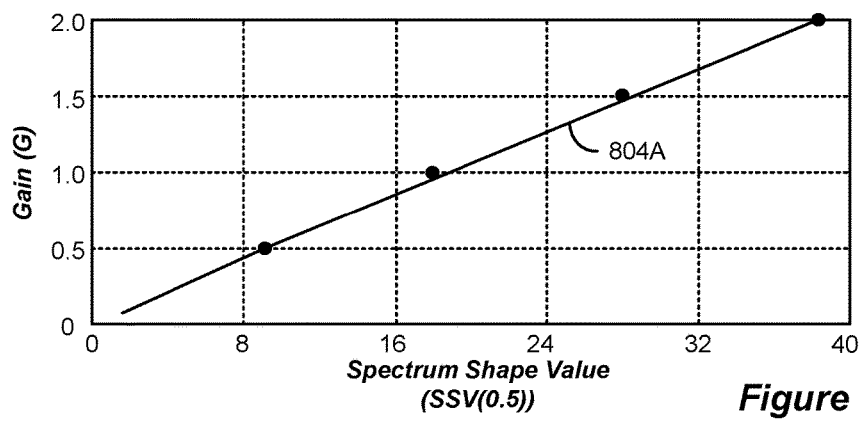

Using the shape quantification algorithm 802 to determine a spectrum shape value (SSV) for a given gamma spectrum 610 allows a relationship to be established between gain and SSV, shown first as relational data 804A in FIGS. 10A through 10C. However, the relational data can also be expressed in more practical terms between $V_{PC}$ and SSV (804B), as described in FIGS. 11A and 11B. The generation of gain/SSV relational data 804A is described first using modeling data altered to simulate different detector gain values. Although premised on modeling data, relational data 804A illustrates the effect of gain changes on spectrum shape.

FIG. 10A shows how changes in detector gain (G) affect the shape of a gamma spectrum 610 using modelled values—i.e., pulse magnitudes 606 that have been modified to different gain values. In FIG. 10A, four different spectra are shown with gains of 0.5, 1.0 (e.g., spectrum 610 of FIG. 9A), 1.5 and 2.0. Notice as expected that a decrease in detector gain results in an increased concentration of pulses 604 having smaller magnitudes 606, which results in a higher count (rates) in the lower-energy channels, and a spectrum that is narrower and shifted to the left. Conversely, an increase in detector gain results in an increased concentration of pulses 604 having higher magnitudes 606, and spectra that are broader and shifted to the right.

Using the shape quantification algorithm 802 described above, the change in spectrum shape can be quantified for these different gain values by computing SSV values for each, as shown in FIG. 10B. Specifically, a count ratio of 0.5 is used, resulting in SSV(0.5) values of 9, 18, 28, and 38 for the increasing gain values respectively. With SSV determined for each of the spectra, relational data 804A relating gain (G) and SSV can be determined, as shown in FIG. 10C. As illustrated, the relational data 804A between gain and spectrum shape value is generally linear, and can be quantified using known linear fitting techniques to establish a linear equation (e.g., $G=X*SSV+Y$). Alternatively, relational data 804A between gain and SSV can be expressed and stored as a table of SSV/gain data points such as (9, 0.5); (18, 1); (28, 1.5); and (38, 2).

Figure 11A:
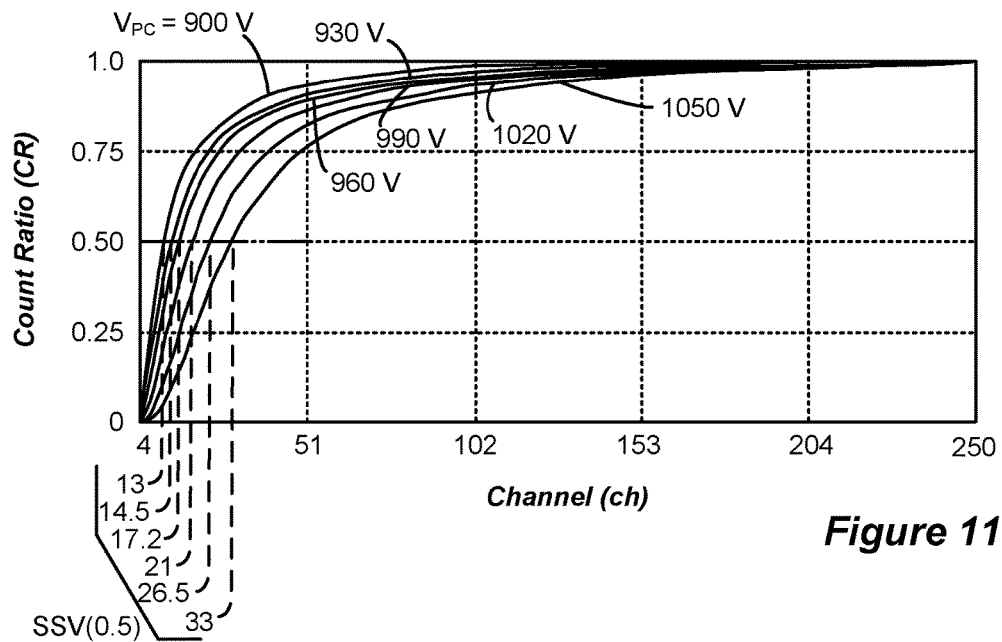
FIGS. 11A and 11B show the generation of relational data between spectrum shape and gain (expressed in terms of voltage), in accordance with an example of the invention.
Figure 11B:
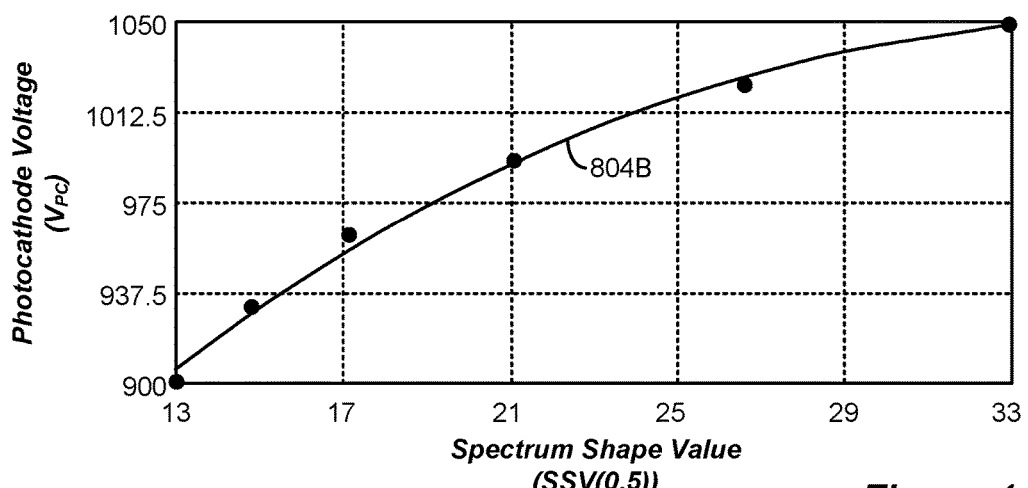

While FIGS. 10A through 10C illustrate determining and expressing relational data 804A between detector gain and spectrum shape using modeling data, more practical relational data 804B may also be determined for individual detectors 200' or a group of similar detectors that relates the photocathode voltage $V_{PC}$ (which affects pulse magnitude 606 and hence gain) and spectrum shape, as shown in FIGS. 11A and 11B. This relational data 804B is more practical because it involves a parameter ($V_{PC}$) that can be directly controlled in the detector 200' (i.e. by the power supply 260). This relational data 804B may be established by generating spectra top-side in the presence of a standard radioactive sample at different values of $V_{PC}$. When relational data 804B is expressed with reference to $V_{PC}$, a magnitude by which $V_{PC}$ can be adjusted to account for drifts in detector gain can be determined and used to compensate for temperature and operating time effects, as discussed further below in after-deployment aspects of the technique.

FIG. 11A shows the normalized count ratios determined for various gamma spectra 610 (not shown) generated using the above-described standard radioactive sample, in which $V_{PC}$ of the photomultiplier tube 204 has been set to 900V, 930V, 960V, 990V, 1020V, and 1050V. (Note that the photocathode voltage $V_{PC}$, while actually a negative voltage, is from this point forth illustrated and processed as a positive voltage for simplicity). As expected, higher voltages lead to higher pulse magnitudes 606, and thus higher gains, which would shift the spectra to the right, and result in higher values for SSV (SSV(0.5) in this example).

The relational data 804B between detector photocathode voltage ($V_{PC}$) and spectrum shape (SSV) as determined from FIG. 11A is illustrated in FIG. 11B. In the same manner as described above, a fitting technique can be applied to the relational data 804B illustrated in FIG. 11B to establish an equation. It will be noted that while relational data 804A between gain and spectrum shape (FIG. 10C) is generally linear, relational data 804B between voltage and spectrum shape may not be linear due to the non-linear effect of detector voltage changes on detector gain. Thus, the relational data 804B between voltage and spectrum shape can be determined through non-linear curve-fitting techniques. Although six voltage levels are illustrated in FIG. 11A, it will be understood that the generation of relational data 804B may involve more or fewer voltage levels. The inventor has determined that the relational data 804B between $V_{PC}$ and SSV can be accurately expressed as a quadratic polynomial equation (e.g., $V_{PC}=X*SSV^2+Y*SSV+Z$). However, curve fitting to establish relational data 804B may be performed with reference to other types of equations as well. Further, relational data 804B, like 804A discussed earlier (FIG. 10C), can be expressed by a table of SSV/$V_{PC}$ data points.

The determined relational data 804A (FIG. 10C) or more-preferably 804B (FIG. 11B) for a particular detector 200' or family of detectors may be stored in memory 254' (FIG. 8) of the detector(s) 200', and used after deployment to adjust the detector's gain, which is discussed next. Such relational data 804 for a detector 200' may be updated periodically (top-side) as part of a calibration process, for example, using the standard radioactive sample discussed earlier.

Preferably, one point within relational data 804A is denoted as a standard gain (i.e., 1), and one point within relational data 804B is denoted as a standard voltage (e.g., $V_{PC}=970$ V) at which the detector 200' will be biased prior to deployment. The standard gain/voltage corresponds to a desired spectrum shape and represents a spectrum shape to which gamma spectra 610 will be adjusted via gain adjustment algorithm 806 after deployment (i.e., upon exposure to temperature and increased operating time) through control of the photocathode voltage ($V_{PC}$). As such, the standard gain/voltage should be selected within a portion of the relational data 804A or 804B that enables control of the gain/voltage both upward and downward.

Figure 12:
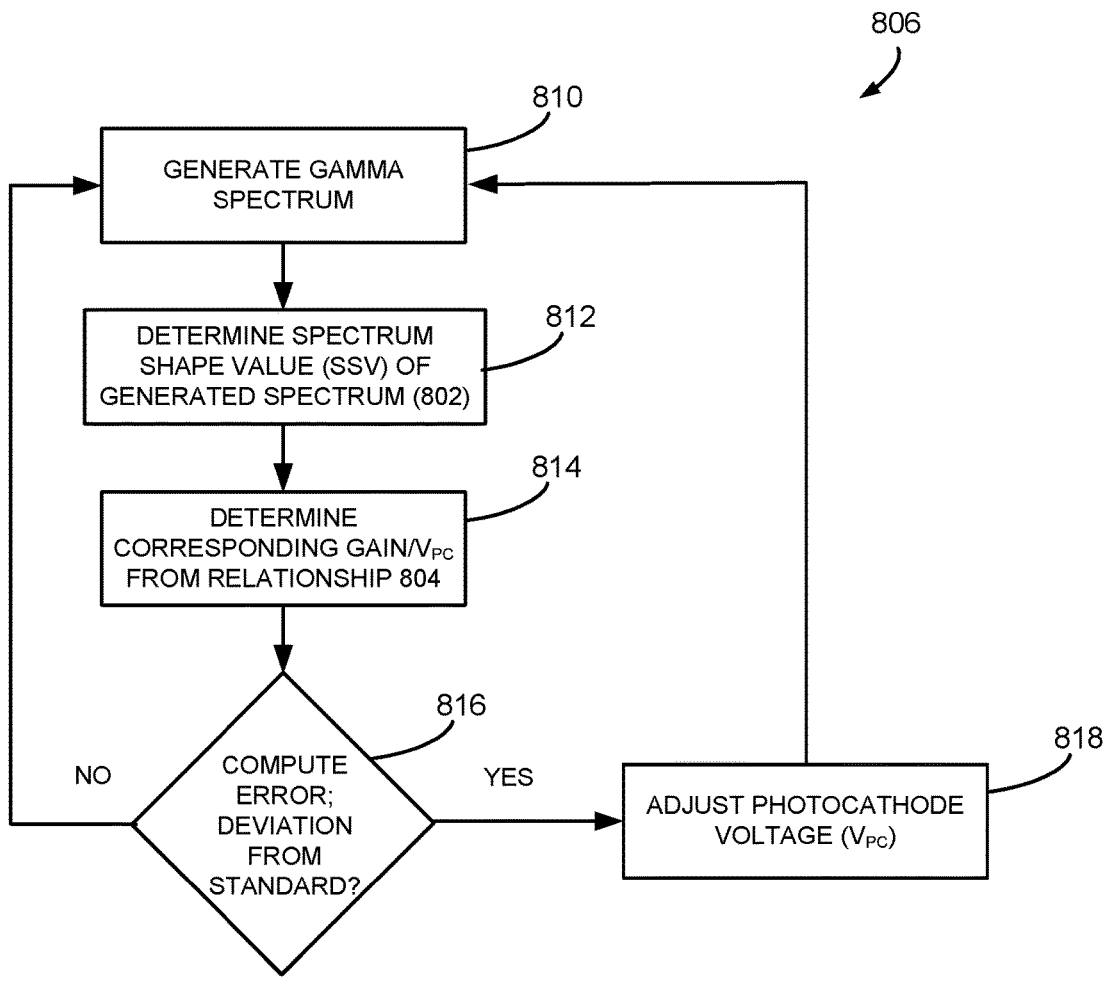
FIG. 12 shows the steps implemented by a gain adjustment algorithm, in accordance with an example of the invention.

The same shape quantification algorithm 802 used pre-deployment to determine the relational data 804, and the relational data 804 itself, are utilized by the gain adjustment algorithm 806 in the detector 200' after deployment to identify changes in the gain of the detector and to adjust the photocathode voltage ($V_{PC}$) to account for such changes. FIG. 12 illustrates the steps in the gain adjustment algorithm 806 in flowchart form, and FIG. 13 illustrates the application of the algorithm 806 to example spectra using $V_{PC}$/SSV relational data 804B.

Figure 13A:
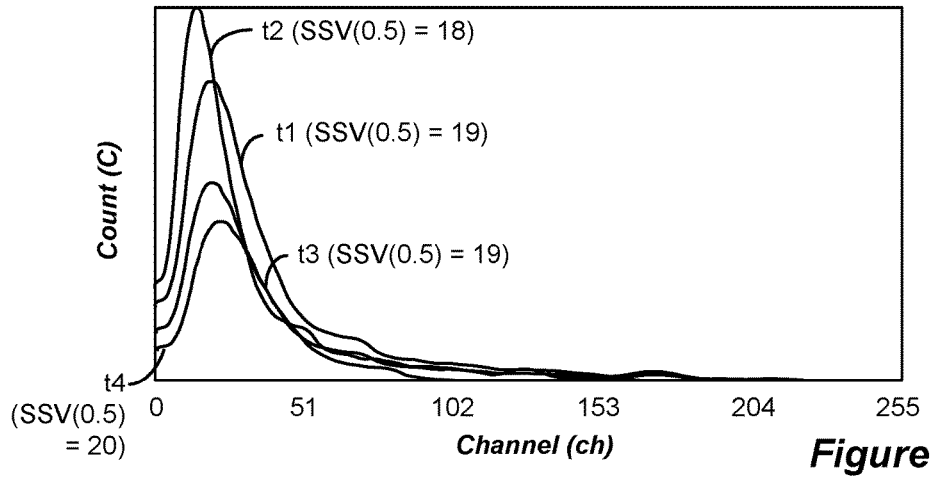
FIGS. 13A-13C show the steps implemented by the gain adjustment algorithm on spectra generated by a detector, in accordance with an example of the invention.

Having stored the relational data 804 in the detector 200' and set a standard voltage (970V, marked with an asterisk in FIG. 13B), the detector 200' is ready to be deployed into service. In use, the detector 200' detects gamma radiation and the controller 256' compiles a gamma spectrum (step 810) in the same manner as described above. A first spectrum generated by the detector 200' at time t1 is shown in FIG. 13A. That spectrum's shape value (SSV) is determined (step 812) using the shape quantification algorithm 802 described earlier (FIGS. 9A and 9B). The spectrum shape value may be determined for each spectrum generated, but it may also be determined less frequently. For example, the controller 256' may not begin determining spectrum shape values for a set amount of time after the detector 200' is deployed, because gain drift may not initially be of concern. Similarly, the spectrum shape value may be determined periodically (e.g., every two minutes or every third spectrum). Spectra taken over a period of time may also be summed, and then spectrum shape determined. When spectra are taken and stored may be customizable parameters of the detector 200'.

Figure 13B:
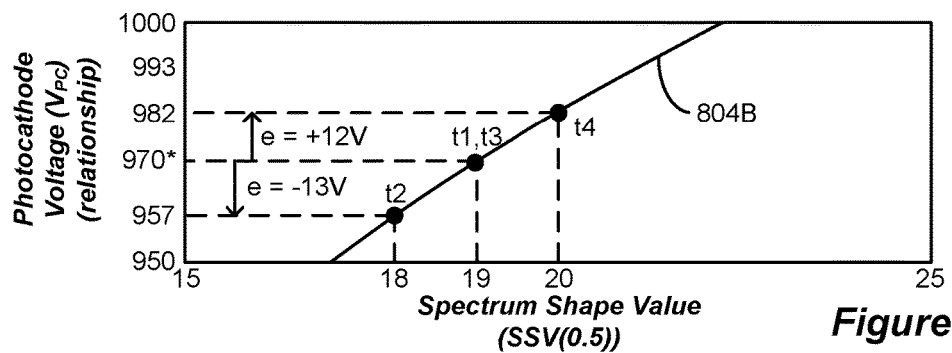

It should be noted that the spectrum shape value should be determined (812) using the same constraints used for the generation of the relational data 804A or 804B. For example, if the relational data 804 is determined on the basis of a count ratio (CR) of 0.5, the spectrum shape value should be determined during deployment using this same count ratio. As shown in FIG. 13B, the calculated spectrum shape value for the first spectrum is SSV(0.5)=19.

After identifying the spectrum shape value, the corresponding gain or voltage (depending on the type of relational data 804A or 804B used) is determined from the relational data 804 (step 814). If the relational data 804 comprises an equation, the determined spectrum shape value is inserted into the equation and the equation is solved for the corresponding gain or voltage value. If the relational data 804 is stored as a table of related values, the spectrum shape value may be utilized to either retrieve a gain or voltage value associated with a corresponding spectrum shape value or to interpolate a gain or voltage value. As illustrated in FIG. 13B, using relational data 804B, a spectrum shape value of 19 corresponds to a voltage of 970V.

The gain/voltage value associated with spectrum shape value is then compared to the standard gain/voltage value to identify whether there is a deviation between the two values, i.e., an error "e" (step 816). This comparison may incorporate a dead band within which it is determined that there is no deviation between the values if such deviation is too small to warrant adjustment. For example, it may be determined that there is no deviation between the two values (e=0) if the difference between the two values is less than 0.5% of the standard gain/voltage. Because spectrum shape value (19) corresponds to the standard voltage value of 970V, there is no deviation at this point in time (step 816; "no"). Therefore, the detector 200' does not adjust $V_{PC}$ and the process continues to take subsequent gamma spectra.

A subsequent spectrum is eventually generated (step 810) at a later time t2, and its spectrum shape value is determined to be 18 (step 812), as shown in FIGS. 13A and 13B. This indicates that detector gain has decreased, possibly because the detector 200' is now hotter or has been in operation longer. The corresponding voltage value is determined to be 957V from the relational data 804B (step 814). At this point, there is a deviation from the standard voltage value of −13 V (e=957−970=−13 V) (step 816; "yes").

Figure 13C:
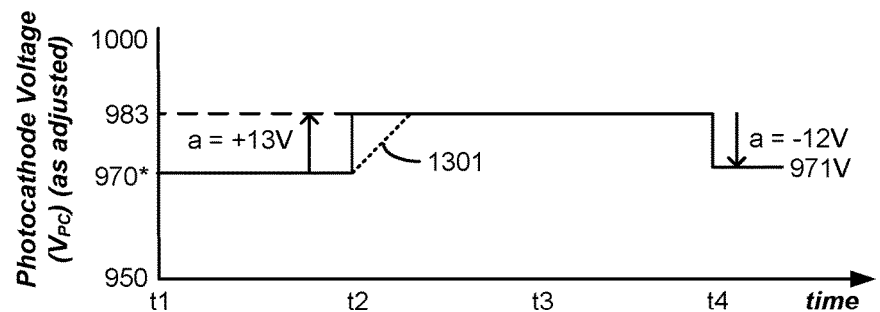

As a result, $V_{PC}$ is adjusted to accommodate for the drift in gain (step 818). Voltage adjustment ("a") should be in the opposite direction from the error as computed (although of course this depends on how error is computed). This is logical, because a decrease in gain (a negative error e) reflected as a decrease in $V_{PC}$ from relational data 804B will be compensated for by increasing the gain (via $V_{PC}$) of the detector 200'. The amount by which the voltage is adjusted can be determined in a number of manners. If the relational data 804B is expressed in terms of voltage, the magnitude of the voltage adjustment may be determined directly as a function of the error. In one embodiment, the $V_{PC}$ may be adjusted (a) by the opposite magnitude of the error (e), i.e., $V_{PC}$ may be adjusted by +13 volts to 983V at time t2, as shown in FIG. 13C. In another embodiment, the error may be converted to a percentage of the standard voltage (−13V/ 970V=−1.34%), with $V_{PC}$ adjusted by the opposite of that amount (e.g., 970*+101.34%=983V). Note that this arrives at the same result (983 V) if the detector 200' is currently operating at the standard voltage. Note also that the increase of $V_{PC}$ at time t2 can be gradual or stair stepped, as shown by the dotted line 1301 in FIG. 13C, which may help to keep gain correction stable and from overcompensating.

After $V_{PC}$ is adjusted (step 818), the detector 200' continues to generate gamma spectra (step 810) and the process continues. Referring again to FIGS. 13A and 13C, a subsequent spectrum is generated at time t3 (step 810), and its spectrum shape value is determined to be 19 (step 812). As at t1, this SSV corresponds to $V_{PC}$=970V from the relational data 804B (step 814). As there is no deviation (error) with respect to the standard voltage value of 970V (step 816; "no"), it is determined that the drift in gain has been corrected and no additional voltage adjustment is needed. As a result, $V_{PC}$ stays at its previous corrected value of 983 V as shown in FIG. 13C.

Notice from FIG. 13A that the spectrum at time t3—which has been gain-adjusted to account for variations in temperature or operating time—has been normalized to the same basic shape as the spectrum taken at time t1, as they are now both characterized by a common SSV (19). For example, it can be seen that the two spectra peak at approximately the same channel/energy. However, these two spectra differ in magnitude (count), with the spectra at time t1 being larger (at least for some channels) than that at t3. Having corrected for these variations, remaining differences in the spectra are presumably due to other effects, most importantly different levels of gamma radiation. Thus, it may be gleaned after operation of the algorithms in the detector 200' that the spectrum taken at time t1 (i.e., depth1) was proximate to a source (formation) having higher levels of gamma radiation than was the detector 200' at time t3 (depth3). As noted earlier, parsing such differences in radiation levels is exactly what detector 200' is designed to detect. This allows the reader to infer the composition of the formation 101 at various times/depths, and hence its likelihood of containing desired natural resources at those times/depths.

Spectra continue to be generated and adjustments made to $V_{PC}$ as the gain adjustment algorithm 806 continues. Further adjustments to $V_{PC}$ may or may not take into account that $V_{PC}$ is currently adjusted away from the standard voltage. For example, at time t3, $V_{PC}$ had been adjusted to 983 V. Assume at time t4 a spectrum with a SSV of 20 is measured, perhaps indicating that temperature has decreased. Consulting relational data 804B (FIG. 13B), it would appear that $V_{PC}$ is too high (e=+12V). Therefore, $V_{PC}$ could be decreased by that amount (a=−12V), as shown in FIG. 13C. Alternatively, and understanding $V_{PC}$'s present value, adjustment can be made using $V_{PC}$ as the new baseline.

While the adjustment of $V_{PC}$ was described in the context of shape-voltage relational data 804B, the adjustment can also be calculated where the relational data 804A is expressed in terms of gain, as described earlier with respect to FIG. 10C. For example, if a change in SSV from 19 to 18 indicates a decrease in gain from 1.08 to 1.00 per relational data 804A, then the current value of $V_{PC}$ can be adjusted by the that difference (+0.08) in gain—i.e., $V_{PC}$(adjusted)=$V_{PC}$(current)*+1.08. Using relational data 804A in this fashion is not as precise as using data 804B, because as noted earlier the relationship between gain and VPC is non-linear. Still, $V_{PC}$ is nonetheless still adjusted in the correct direction, and can be corrected as necessary during the analysis of subsequent spectra.

In another embodiment, the controller 256' may implement a PID (proportional-integral-derivative) control algorithm that adjusts $V_{PC}$ as a function of the error between the spectrum shape value set point (i.e., that corresponding to the standard voltage/gain value, e.g., 19 for 970/1.0 as in the example above) and the SSV of the measured spectrum. In such an example, the controller 256' is tuned with appropriate proportional, integral, and derivative parameters to control the manner in which the controller reacts to changes in SSV. Thus, rather than determining the gain or voltage via relational data 804 (i.e., step 814), the controller 256' instead merely seeks to control $V_{PC}$ so as to keep SSV to its standard value. Stated differently, in such an embodiment, the algorithm 806 is modified to remove step 814, and to change step 816 to determine the deviation (error) between the measured SSV and the standard SSV.

Figure 14:
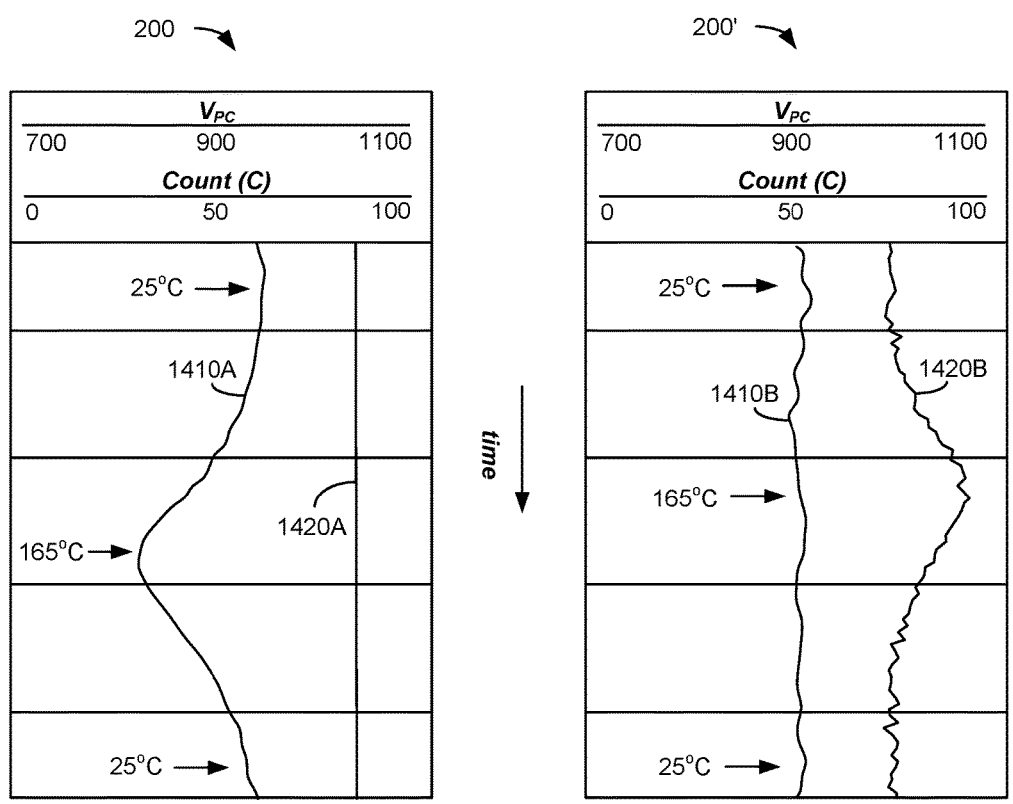
FIG. 14 shows data collected by two detectors, one in which photocathode voltage is adjusted in accordance with the gain adjustment algorithm and one in which photocathode voltage is not adjusted, to demonstrate the effectiveness of the gain adjustment algorithm, in accordance with an example of the invention.

The effectiveness of the gain adjustment algorithm 806 has been observed in experimental tests in which a detector 200 and a detector 200' measure a standard sample at varying temperatures. The results of these tests are illustrated in FIG. 14. The total count rate for each detector has been adjusted to remove noise, but, as illustrated, the total count rate 1410A measured by the detector 200 (which does not implement the gain adjustment algorithm 806 or any other gain adjustment process) deviates as the temperature is adjusted from 25° C. to 165° C. and then back to 25° C. The decrease in total count rate 1410A occurs as a result of the decreased gain of the detector 200 at increased temperatures, which causes a decrease in the magnitude of the pulses 604 associated with certain gamma radiation to the extent that some of the pulses are not detectable (i.e., certain pulses 604 have magnitudes 606 below the level of a low-level discriminator and are therefore not counted in the total count rate 1410A). It will be noted that $V_{PC}$ 1420A is constant throughout the operation of detector 200. In contrast, detector 200' implements the gain adjustment algorithm 806 and, as a result, its voltage 1420B is adjusted to account for changes in gain. As illustrated, the total count rate 1410B measured by the detector 200' does not deviate as the temperature is changed. It can be seen, then, that the gain adjustment algorithm 806 effectively adjusts $V_{PC}$ 1420B to account for changes in the gain of the detector 200' as a result of temperature.

While the above description has focused on detector tools/detectors utilized during well drilling operations (i.e., logging while drilling), it is well known that similar detector arrangements may be deployed into a wellbore after it has been drilled. For example, similar gamma detectors may be conveyed into a wellbore via wireline after the drilling equipment has been removed from the wellbore. The disclosed invention finds equal utility in gamma detectors of varying types, whether used for logging a well during drilling operations, for logging a well after the completion of drilling operations, or for applications outside of the subterranean logging field.

While the invention herein disclosed has been described in terms of specific embodiments and applications thereof, numerous modifications and variations could be made thereto by those skilled in the art without departing from the scope of the invention set forth in the claims.

What is claimed is:

1. A detector, comprising:
   a photomultiplier tube configured to generate electrical signals in response to gamma radiation observed by the detector; and
   electronic circuitry configured to:
   receive the electrical signals;
   generate a spectrum based on a magnitude of each of the electrical signals;
   determine a spectrum shape value based on a count ratio for the spectrum; and
   adjust a gain of the detector when the determined spectrum shape value is different than an expected spectrum shape value.

2. The detector of claim 1, wherein the electronic circuitry converts each signal into a digital value based on its magnitude.

3. The detector of claim 1, further comprising a scintillation crystal that is coupled to the photomultiplier tube and emits light upon interacting with the gamma radiation.

4. The detector of claim 1, wherein the electrical signals comprise a plurality of pulses, each pulse corresponding to a gamma radiation photon observed by the detector.

5. The detector of claim 1, wherein the electronic circuitry is configured to generate the spectrum by assigning each signal to one of a plurality of channels according to a magnitude of the signal, wherein each channel represents a range of signal magnitudes.

6. The detector of claim 5, wherein the spectrum represents a quantity of the electrical signals in each of the plurality of channels.

7. The detector of claim 5, wherein the count ratio is a ratio of a first integral of the spectrum between a lower channel boundary and a specified channel to a second integral of the spectrum between a lower channel boundary and an upper channel boundary.

8. The detector of claim 7, wherein the spectrum shape value is equal to the specified channel at which the count ratio is equal to a predetermined value.

9. The detector of claim 1, wherein the electronic circuitry is configured to adjust the gain of the detector by adjusting a voltage supplied to the photomultiplier tube.

10. The detector of claim 9, wherein the detector comprises a memory that stores data that relates spectrum shape value to photomultiplier tube voltage.

11. The detector of claim 10, wherein the electronic circuitry that is configured to adjust the voltage supplied to the photomultiplier tube comprises electronic circuitry that is configured to:
    determine a first photomultiplier tube voltage that corresponds to the determined spectrum shape value from the data;
    calculate a difference between the first photomultiplier tube voltage and a second photomultiplier tube voltage; and
    adjust the voltage supplied to the photomultiplier tube based on the calculated difference.

12. The detector of claim 11, wherein the second photomultiplier tube voltage is a standard operating voltage.

13. A method for adjusting a gain of a gamma detector, comprising:
    detecting gamma radiation using the gamma detector;
    generating a spectrum corresponding to the detected gamma radiation;
    determining a spectrum shape value based on a count ratio for the spectrum; and
    adjusting the gain of the gamma detector when the determined spectrum shape value is different than an expected spectrum shape value.

14. The method of claim 13, wherein the spectrum represents a quantity of detected gamma radiation within each of a plurality of energy ranges.

15. The method of claim 13, wherein the count ratio is a ratio of a first integral of the spectrum between a lower channel boundary and a specified channel to a second integral of the spectrum between a lower channel boundary and an upper channel boundary.

16. The method of claim 15, wherein the spectrum shape value is equal to the specified channel at which the count ratio is equal to a predetermined value.

17. The method of claim 13, wherein adjusting the gain of the gamma detector comprises adjusting a voltage applied across the detector.

18. The method of claim 17, wherein the act of adjusting the voltage applied across the detector comprises:
    determining a first voltage that corresponds to the determined spectrum shape value from a relationship between voltage and spectrum shape value;
    calculating a difference between the first voltage and a standard voltage; and
    adjusting the voltage applied across the detector based on the calculated difference.

19. The method of claim 18, wherein the relationship comprises a numerical equation.

20. A tool, comprising:
a detector housing; and
one or more detectors each comprising:
    a scintillation crystal that emits light upon interacting with gamma radiation;
    a light sensor coupled to the scintillation crystal and configured to generate electrical signals in response to the light; and
    electronic circuitry configured to:
        receive the electrical signals;
        generate a spectrum based on a magnitude of each of the electrical signals;
        determine a spectrum shape value based on a count ratio for the spectrum; and
        adjust a gain of the detector when the determined spectrum shape value is different than an expected spectrum shape value.

* * * * *